United States Patent [19]

Holmes

[11] 4,074,950
[45] Feb. 21, 1978

[54] LOCKING THREAD FORMING TAP

[76] Inventor: Horace D. Holmes, 28576 Green Willow, Farmington Hills, Mich. 48024

[21] Appl. No.: 729,207

[22] Filed: Oct. 4, 1976

[51] Int. Cl.² .............................................. B23G 5/06
[52] U.S. Cl. ................................... 408/220; 10/141 R
[58] Field of Search ............... 408/215, 216, 217, 218, 408/219, 220, 221, 222; 10/141 R

[56] References Cited

U.S. PATENT DOCUMENTS

| 250,728 | 12/1881 | Harvey | 10/141 R |
|---|---|---|---|
| 2,121,193 | 6/1938 | Hanicke | 408/215 X |

FOREIGN PATENT DOCUMENTS

| 57,333 | 4/1948 | France | 10/141 R |
|---|---|---|---|
| 118,046 | 12/1926 | Switzerland | 10/141 R |

Primary Examiner—Z. R. Bilinsky
Attorney, Agent, or Firm—Krass & Young

[57] ABSTRACT

A thread forming tap comprising a shank section, a body section extending longitudinally from the shank section, a helical thread formed on the body section and having radially outwardly converging flank portions which define an inclined ramp arranged at a preselected angle to the axis of the tap and adapted to form a complementary inclined locking ramp on the thread to be formed by the tap.

2 Claims, 5 Drawing Figures

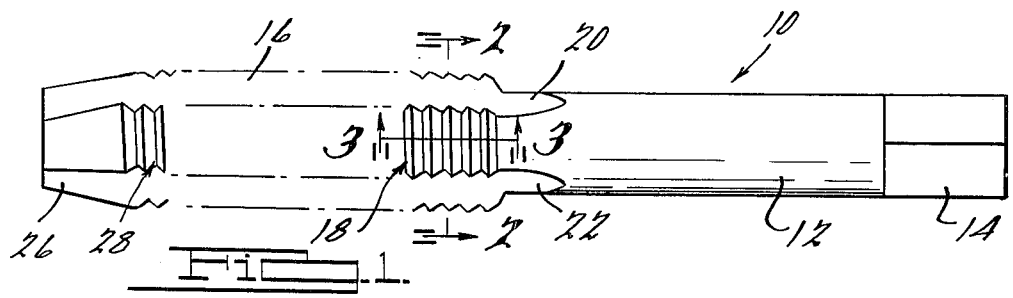
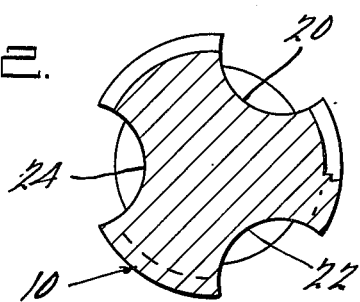
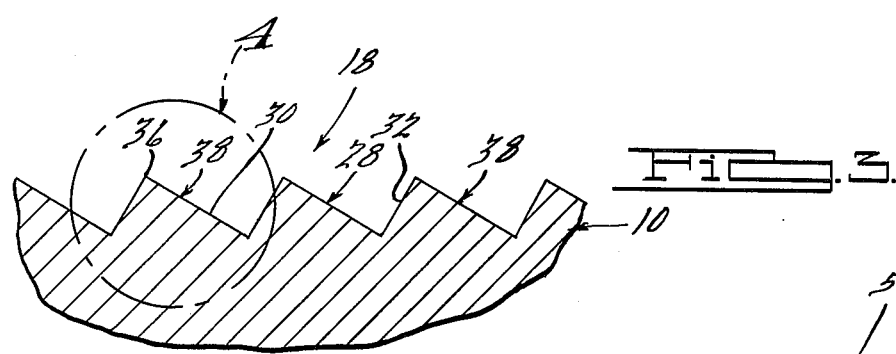
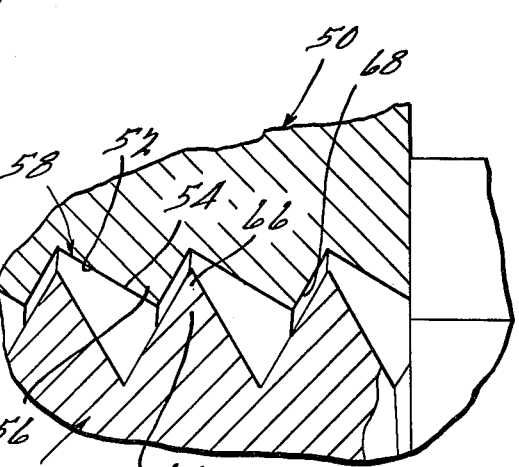
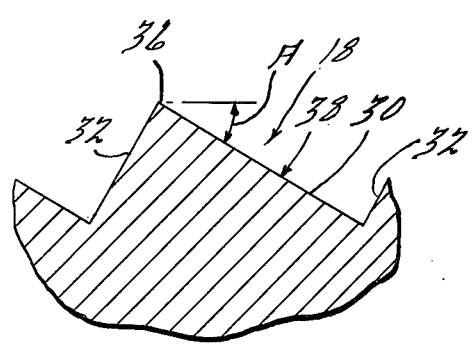

LOCKING THREAD FORMING TAP

BACKGROUND OF THE INVENTION

The present invention is generally directed toward thread forming taps and, more particularly, to a new and improved thread forming tap for use in providing a locking thread form on the interior of a suitable aperture, and blind bores and patentably distinguishes from U.S. Pat. Nos. 896,503; 1,961,003 and 3,125,722 which were cited in a related application, Ser. No. 649,570, filed Jan. 15, 1976 for "Locking Thread Forming Tap".

SUMMARY OF THE INVENTION

The tap of the present invention is adapted to form a thread within a bore having a flat area or ramp located along one side or flank of the thread. The ramp is located or oriented at a preselected angle relative to the axis of the bore and the particular angle of such ramp is designed so as to allow the threads to be manufactured within normal commercial tolerances with standard commercial tooling. Assurance is had that positive contact is made with the crown or crest of the mating thread of the male threaded element inserted into the bore to engage the ramp and thereby positively prevent loosening of the male member relative to the bore under vibrational or other adverse conditions. The angle of the ramp formed on the thread of the tap, and hence the angle of the complementary ramp forced by the tap in a bore is in the order of 25° – 35° from the axis of the bore. The tap is designed such that the inclined ramp thereof permits free running of the male threaded member relative to the tapped bore until such time as the degree of loading on the male member and workpiece in which the tapped bore is formed reaches a predetermined magnitude, whereupon the thread crown of the male member moves into contact with the ramp or flank of the threaded bore in the workpiece.

BRIEF DESCRIPTION OF THE DRAWING

FIG. 1 is a side elevational view of the thread forming tap of the present invention;

FIG. 2 is an enlarged transverse cross-sectional view taken substantially along the line 2—2 of FIG. 1;

FIG. 3 is an enlarged fragmentary cross-sectional view taken substantially along the line 3—3 of FIG. 1;

FIG. 4 is an enlarged view of the structure shown within the circle 4 of FIG. 3; and FIG. 5 is a fragmentary cross-sectional view of a threaded bore formed with the tap of the present invention and operatively associated with the thread of a typical machine bolt or the like.

DETAILED DESCRIPTION OF A PREFERRED EMBODIMENT

Referring now in detail to the drawing and in particular to FIG. 1 thereof, a helical thread forming tap, generally designated by the numeral 10, is shown as comprising a generally cylindrically-shaped shank section 12 having a tool-engaging end portion 14 at one end thereof. The opposite end of the shank section is provided with a tap body section 16 which has a thread cutting form 18. A plurality of circumferentially spaced longitudinally extending grooves 20, 22, 24 are formed in the body section 16 and function to provide relieved cutting edges and generally as areas into which chips accumulate during a thread forming operation. Additionally, the grooves 20, 22, 24 serve to vent the bottom of blind bores to thereby reduce tap loading as is known in the art. The forward (left) end of the tap 10 is provided with a tapered or reduced diameter pilot end portion or nose 26 for properly orienting the tap 10 within a suitable bore in which a thread is to be formed.

The thread cutting form 18 comprises a helical thread 28 which, as best seen in FIGS. 3 and 4, has radially outwardly converging flanks 30, 32 which define root and crest or crown areas 34 and 36, respectively. In accordance with the principles of the present invention, the flank 30 between the root and crown areas 34 and 36 forms an inclined ramp 38 which is arranged at a preselected angle A relative to the axis of the tap 10. The angle is in the order of 25° to 35° and is preferably approximately 30° from the axis of the tap so as to assure positive engagement of a crown 66 of an associated thread male member with the ramp 54 of the thread form provided by the tap 10 and consistent with modern manufacturing tolerances. The other flank 32 of each of the threads 28 slopes substantially at an angle of the standard thread, i.e. approximately 60°, relative to the axis of the tap 10, although this angle may be varied somewhat for different applications and tolerances, as illustrated in FIG. 3.

In FIG. 5 a typical workpiece 50 is illustrated, such as a nut having a bore 52 in which a thread 54 is formed by the tap 10. In particular, the thread form 54 consists of a helical thread 56 having a ramp 58 that is complementary to and formed by the ramp 38 of the tap 10. The opposing flanks 68 of each thread 56 has a slope substantially that of a standard thread, i.e. approximately 60°. The threaded bore 52 is adapted to receive a suitable male threaded member 62 having a Standard external thread 64 which defines the helical crown area 66. When the threaded member 62 is threaded into the bore 52 of the workpiece 50 in the position shown in FIG. 5, the member 62 will be free running, i.e., freely rotatable, until such time as the workpiece 50 and threaded member 62 are subjected to a predetermined magnitude of loading. When this occurs, the crown areas 66 of the thread 64 will contact the ramps 58, thereby providing a substantial degree of contact between the respective threads which locks the threaded member 62 within the bore 52. When an increased amount of torsional force is applied, for example, to the member 62, an even greater degree of contact will occur between the crown area 66 and ramp 58 and any further relative lateral movement between the workpiece 50 and thread member 62 is positively prevented so as to assure against loosening thereof.

It is to be appreciated that the principles of the present invention, as incorporated in the tap 10, could be equally applicable on thread cutting dies for providing locking thread forms on externally threaded members, such as the member 62.

What is claimed is:

1. In a thread forming tap, a shank section, a body section extending longitudinally from the shank section having axially disposed grooves therein, a helical thread on the body section having dissimilar angularly disposed flanks extending from a pilot portion to a final thread-cutting portion representing the final configuration of the thread to be formed by said tap, one said flank in said final thread cutting portion lying at an angle relative to the longitudinal axis of the tap which is substantially greater than 35°, the opposing flank facing the shank section in said final thread-cutting portion forming a ramp of substantially less slope than that of said first flank and being arranged at an angle of approximately 25° – 35° relative to the axis of said tap.

2. The invention as set forth in claim 1, wherein the slope of said ramp is approximately 30°.

* * * * *